(12) United States Patent
Wu

(10) Patent No.: US 6,389,832 B1
(45) Date of Patent: May 21, 2002

(54) GRILLE FOR ROOM AIR-CONDITIONER

(76) Inventor: Li Shen Wu, P.O. Box 82-144, Taipei (TW)

( * ) Notice: Subject to any disclaimer, the term of this patent is extended or adjusted under 35 U.S.C. 154(b) by 0 days.

(21) Appl. No.: 09/820,828

(22) Filed: Mar. 30, 2001

(51) Int. Cl.⁷ ............................................. F25D 23/02
(52) U.S. Cl. ............................. 62/262; 62/317; 62/201
(58) Field of Search .................... 62/262, 317; 454/201

(56) References Cited

U.S. PATENT DOCUMENTS

| | | | |
|---|---|---|---|
| 4,667,483 A | * | 5/1987 | Hashimoto .................... 62/262 |
| 5,192,347 A | * | 3/1993 | Lee ............................. 55/359 |
| 5,197,299 A | * | 3/1993 | Sohn et al. .................... 62/262 |
| 5,379,609 A | * | 1/1995 | Matsumoto et al. .......... 62/262 |
| 5,660,605 A | * | 8/1997 | Chan et al. ..................... 55/274 |
| 5,846,302 A | * | 12/1998 | Putro ............................. 96/66 |
| 6,006,534 A | * | 12/1999 | Correa ......................... 62/262 |
| 6,223,547 B1 | * | 5/2001 | Da Silva et al. .............. 62/262 |

* cited by examiner

*Primary Examiner*—William Doerrler
*Assistant Examiner*—Mark S. Shulman
(74) *Attorney, Agent, or Firm*—A & J

(57) ABSTRACT

A grille includes a frame base for mounting in the air input port of a room air-conditioner, the frame base having a latticed screen, a front recessed portion in front of the latticed screen, a plurality of stop rods spaced around the front recessed portion, and two peripheral flanges of different widths at two sides for mounting, and a flexible filter element inserted into the front recessed portion of the frame base and secured to the latticed screen by the stop rods.

1 Claim, 3 Drawing Sheets

GRILLE FOR ROOM AIR-CONDITIONER

BACKGROUND OF THE INVENTION

1. Field of the Invention

The present invention relates to room air-conditioners and, more particularly, to a grille for room air-conditioner, which is detachable to facilitate maintenance work and, which uses a printed filter element to keep the latticed screen from sight.

2. Brief Description of the Prior Art

A room air-conditioner has an air input port and an air output port. The air input port is covered with a grille. The grille comprises a frame and a filter element (of foam material) mounted inside the frame adapted to remove solid particles from air passing through. Because the filter element is disposed inside (on the back side) the frame, the latticed structure of the frame is exposed to the outside after installation of the grille in the air input port of the room air-conditioner. The latticed structure of the frame does not cause a sense of beauty. Further, this design complicates the replacement of the filter element.

In case the filter element is accumulated with a big volume of dust, the user cannot immediately visually check the condition.

SUMMARY OF THE INVENTION

The present invention has been accomplished to provide a grille for room air-conditioner, which eliminates the aforesaid drawbacks. It is one object of the present invention to provide a grille for room air-conditioner, which causes a sense of beauty when installed in the room air-conditioner. It is another object of the present invention to provide a grille for room air-conditioner, which enables the user to conveniently visually check the accumulation of dust in the filter element. It is still another object of the present invention to provide a grille for room air-conditioner, which is easy to install. According to one aspect of the present invention, the grille comprises a frame base for mounting in the air input port of a room air-conditioner, the frame base having a latticed screen, a front recessed portion in front of the latticed screen, a plurality of stop rods spaced around the front recessed portion, and two peripheral flanges of different widths at two sides for mounting, and a flexible filter element inserted into the front recessed portion of the frame base and secured to the latticed screen by the stop rods. According to another aspect of the present invention, the filter element is printed with a design.

DETAILED DESCRIPTION OF THE PREFERRED EMBODIMENT

Figure 1:
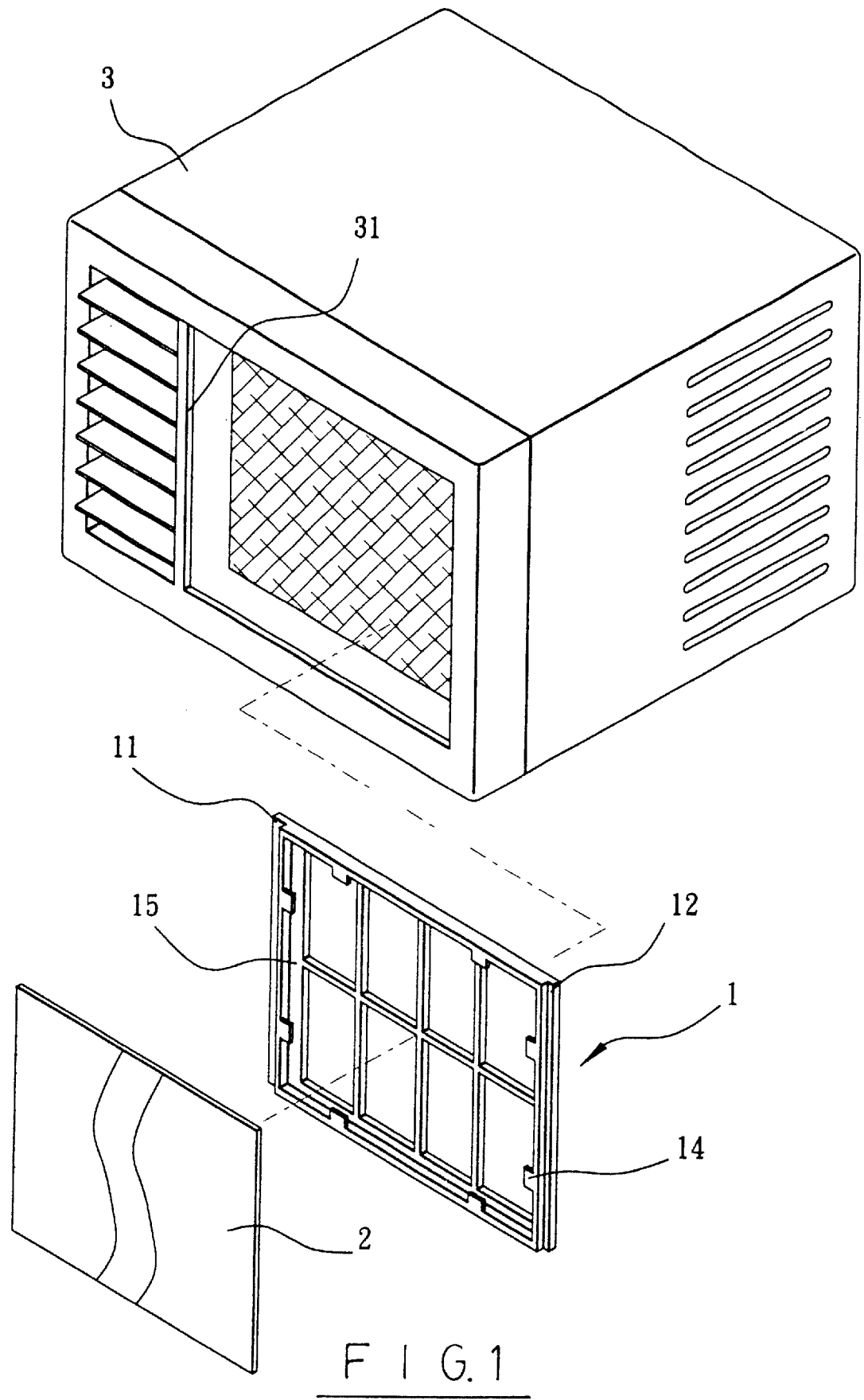
FIG. 1 illustrates the relationship between frame base and the filter element and the relationship between frame base and the room air-conditioner according to the present invention.
Figure 2:
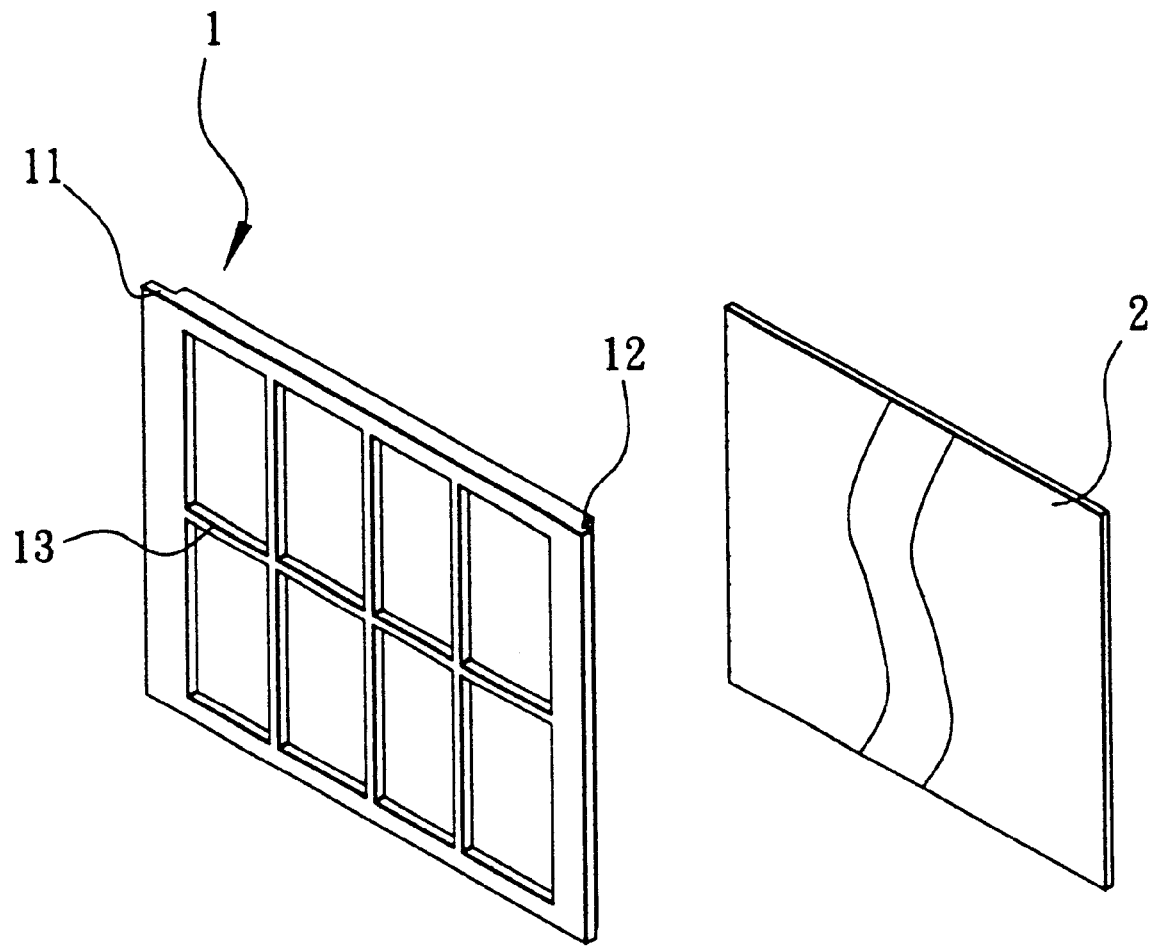
FIG. 2 is an exploded view of the grille according to the present invention.

Referring to FIGS. 1 and 2, a grille for room air-conditioner in accordance with the present invention is generally comprised of a frame base 1 and a filter element 2. The frame base 1 is an open frame having a latticed screen 13, a front recessed portion 15 in front of the latticed screen 13, a plurality of stop rods 14 spaced around the front recessed portion 15, a first peripheral flange 11 extended along one lateral side, and a second peripheral flange 12 extended along the opposite lateral side. The width of the first peripheral flange 11 is relatively greater than the second peripheral flange 12. The filter element 2 is a flexible member made of non-woven fabric. Preferably, the filter element 2 is printed with a design that causes a sense of beauty. During assembly process, the filter element 2 is curved and then put in the front recessed portion 15. After insertion into the front recessed portion 15, the filter element 2 is secured to the frame base 1 by the stop rods 14. When assembled, the filter element 2 keeps the latticed screen 13 from sight. Because the filter element 2 is installed in the frame base 1, it can easily be installed in or removed from the room air-conditioner.

Figure 3:
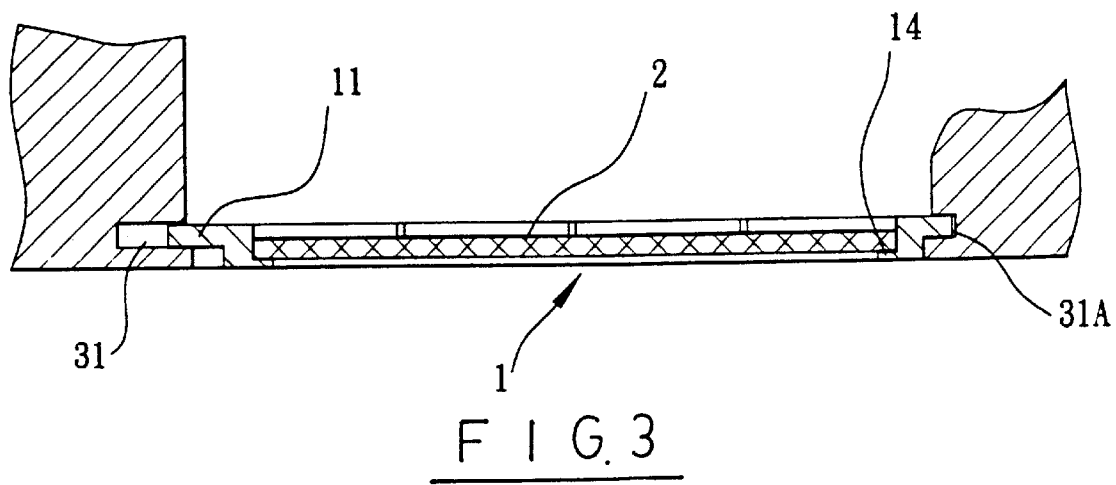
FIG. 3 is a sectional view showing the grille installed in the room air-conditioner (Step I).
Figure 4:
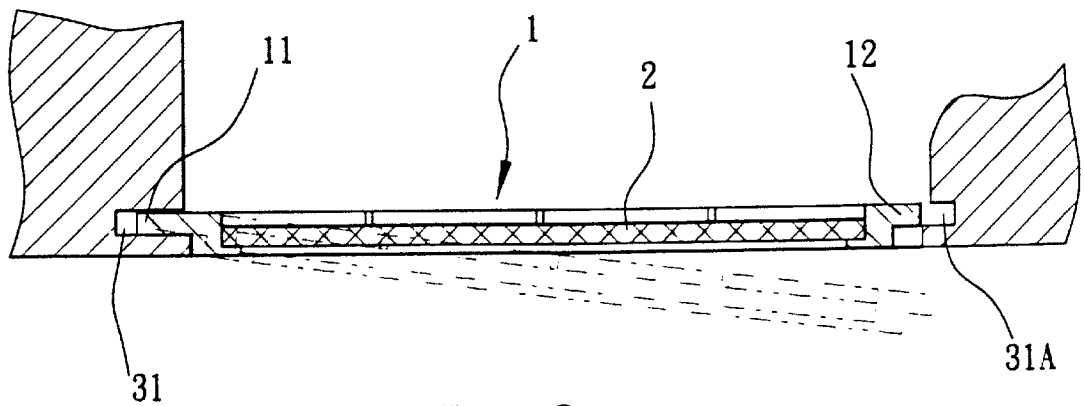
FIG. 4 a sectional view showing the grille installed in the room air-conditioner (Step II).

Referring to FIGS. 3 and 4, the room air-conditioner 3 has two coupling grooves 31 and 31A vertically disposed at two opposite lateral sides of the air input port thereof. During installation of the grille, the first peripheral flange 11 of the frame base 1 is inserted into one coupling groove 31 of the room air-conditioner 3, and then the second peripheral flange 11 of the frame base 1 is inserted into the other coupling groove 31 of the room air-conditioner 3, for enabling the frame base 1 to be secured to the air input port of the room air-conditioner 3 (see FIG. 3). When removing the grille from the room air-conditioner 3, the frame base 1 is pushed sideways to disengage the second peripheral flange 12 from the corresponding coupling groove 31A of the room air-conditioner 3, for enabling the frame base 1 to be removed from the air input port of the room air-conditioner 3 (see FIG. 4). Because the grille can easily be removed from the room air-conditioner 3, the maintenance work of the grille is easy.

A prototype of grille for room air-conditioner has been constructed with the features of FIGS. 1~4. The grille functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A grille for a room air-conditioner having two coupling grooves vertically disposed at two opposite lateral sides of an air input port thereof, comprising:

a frame base which is an open frame having a latticed screen, a front recessed portion in front of said latticed screen, a plurality of stop rods spaced around said front recessed portion, a first peripheral flange extended along one lateral side, and a second peripheral flange extended along an opposite lateral side, width of said first peripheral flange being relatively greater than said second peripheral flange; and a filter element which is a flexible member made of non-woven fabric and printed with a design, said filter element being inserted into said front recessed portion of said frame base and secured to said latticed screen by said stop rods;

whereby during installation of said grille, said first peripheral flange of said frame base is inserted into one coupling groove of said room air-conditioner, and then said second peripheral flange of said frame base is inserted into another coupling groove of said room air-conditioner for enabling said frame base to be secured to said air input port of said room air-conditioner, and when removing said grille from said room air-conditioner, said frame base is pushed sideways to disengage the second peripheral flange from a corresponding coupling groove of said room air-conditioner for enabling said frame base to be removed from said air input port of said room air-conditioner, thereby enabling said grille to be easily removed from said room air-conditioner and therefore facilitating maintenance work of said grille.

* * * * *